United States Patent
Sasaki et al.

[11] Patent Number: 4,769,535
[45] Date of Patent: Sep. 6, 1988

[54] DUSTPROOF STRUCTURE FOR OPTICAL COORDINATE INPUT APPARATUS

[75] Inventors: Hiroaki Sasaki; Kazuo Hasegawa; Junichi Ouchi, all of Furukawa, Japan

[73] Assignee: Alps Electric Co., Ltd., Japan

[21] Appl. No.: 938,548

[22] Filed: Dec. 5, 1986

[30] Foreign Application Priority Data

| | | | |
|---|---|---|---|
| Jan. 7, 1986 | [JP] | Japan | 61-217 |
| Jan. 7, 1986 | [JP] | Japan | 61-218 |
| Apr. 22, 1986 | [JP] | Japan | 61-59609[U] |

[51] Int. Cl.$^4$ ............................................. G01V 9/04
[52] U.S. Cl. ..................................... 250/221; 250/239
[58] Field of Search ..................... 250/221, 222.1, 239; 340/365 P, 555-557

[56] References Cited

U.S. PATENT DOCUMENTS

| | | | |
|---|---|---|---|
| 4,306,147 | 12/1981 | Fukuyama et al. | 250/221 |
| 4,340,813 | 7/1982 | Sauer | 250/221 |
| 4,354,106 | 10/1982 | Walter | 250/221 |
| 4,384,201 | 5/1983 | Carroll et al. | 250/221 |
| 4,387,367 | 6/1983 | Fisher | 250/221 |
| 4,672,558 | 6/1987 | Beckes et al. | 340/365 P |

*Primary Examiner*—David C. Nelms
*Assistant Examiner*—Stephone B. Allen
*Attorney, Agent, or Firm*—Guy W. Shoup; Leighton K. Chong; Paul J. Winters

[57] ABSTRACT

An optical coordinates input apparatus includes pairs of first light emitting elements and first light receiving elements, a plurality of pairs of second light emitting elements and second light receiving element having a light path intersecting a light path of the first light emitting elements and the first light receiving elements, and a filter section disposed on the front side of the light paths of the optical semiconductor elements for passing therethrough a light in the paths. The apparatus further includes a device from preventing a flow of an air containing dust from entering a space between the optical conductor elements and the filter section.

8 Claims, 7 Drawing Sheets

DUSTPROOF STRUCTURE FOR OPTICAL COORDINATE INPUT APPARATUS

BACKGROUND OF THE INVENTION

1. Field of the Invention

The present invention relates to a coordinates input apparatus of an optical detection type which is attached on a front surface of a display unit for detecting a position of coordinates in a display surface thereof and for inputting the position of coordinates to a computer, and in particular, to a countermeasure for preventing dust.

2. Description of the Prior Art

Coordinates input apparatuses for manually inputting data of positions of coordinates to a computer are constructed in various types, for example, electromagnetic induction, electrostatic capacitance, transparent electrode, and optical detection types. Among these various types of coordinates input apparatuses, the optical detection type has attracted attention with respect to reliability and operability in which the apparatus is mounted on the front surface of a display unit and when an arbitrary position on the display surface of the display unit is pressed by a finger or the like to interrupt a path of light, the location of coordinates can be defined without directly touching a device detecting the coordinates position. (This type of apparatus is simply referred to as a coordinates input apparatus 12 herebelow).

FIGS. 12-16 are diagrams illustrating the prior art coordinates input apparatus. FIG. 12 is a perspective view of the coordinates input apparatus mounted on the front surface of a display unit. FIG. 13 is a cross-sectional view illustrating the main portion on a light receiving side of the coordinates input apparatus. FIG. 14 is a schematic diagram of the rear side illustrating an internal structure of the coordinates input apparatus with the rear panel removed.

In these diagrams, the coordinates input apparatus primarily comprises a frame 1 in a form of approximately a rectangle having an opening section 2 at a central portion thereof, pairs of a plurality of light emitting elements 4 such as LED's and a plurality of light receiving elements 5 such as phototransistors, the light emitting elements 4 and the light receiving elements 5 being disposed on the opposing edges, respectively on the rear side of the frame 1, namely, on the side opposite to a display surface 3a of a display unit 3 using a CRT or the like, and an arithmetic/operation unit 6 for detecting from the pairs of the light emitting elements 4 and the light receiving elements 5 a position where a light path 10 is interrupted and for inputting the position.

The light emitting elements 4 and the light receiving elements 5 are fixedly mounted on a base plate 7 disposed in the frame 1 in such a fashion that a light emitting section 4a and a light receiving section 5a of each pair of the elements 4 and 5 oppose to each other; whereas on the front surface of a light receiving section 5a of the light receiving element 5, a light blocking plate 8 having light passing holes 8a with a predetermined area is so disposed that only an incident light from a light emitting element 4 paired with the light receiving element 5 can be received. Moreover, on the front side of the light blocking plate 8 and the light emitting elements 4, namely, in the peripheral portion of an operation area A, an infrared-ray filter 9 is mounted on the overall regions thereof to block the visual light. Consequently, an invisible light path 10 is formed by use of the ultrared-ray filter 9 in the operation area A on the front side of the display surface 3a.

Next, a description will be given of the principle of an input operation of the coordinates input apparatus having above-mentioned configuration. For example, as shown in FIG. 12, if a finger 20 or the like touches a location on the display surface 3a to input the coordinates data thereof, the light path 10 associated with the location is blocked, which enables to define the position of the coordinates. That is, by sequentially causing light emission of the light emitting elements 4 to effect scanning, the blocked light path 10 in the x and y directions can be detected by use of the light receiving elements 5. The light path 10 is determined by the arithmetic/operation unit 6 and the position of the coordinates is transmitted to the host computer (not shown).

As another prior art example, FIGS. 15-16 show an apparatus having a Video Display Terminal (VDT) filter disposed on the front side of a CRT display. FIG. 15 is a cross-sectional view of the primary section on the light receiving side, whereas FIG. 16 is a rear view illustrating the inner configuration thereof with the rear panel removed.

The coordinates input apparatus primarily comprises a frame 1 in a form of approximately a rectangle having an opening section 2 at a central portion thereof, pairs of a plurality of light emitting elements 4 such as LED's and a plurality of light receiving elements 5 such as phototransistors, the light emitting elements 4 and the light receiving elements 5 being disposed on the opposing edges, respectively on the rear side of the frame 1, namely, on the side opposite to a display surface 3a of a display unit 3 using a CRT or the like, and an arithmetic/operation unit 6 for detecting from the pairs of the light emitting elements 4 and the light receiving elements 5 a position where a light path 10 is interrupted and for inputting the position of the coordinates to the host computer. Each terminal of the light emitting elements 4 and the light receiving elements 5 is soldered on a base plate 7 disposed in the frame 1 in such a fashion that a light emitting section 4a and a light receiving section 5a of each pair of the optical semiconductor elements 4 and 5 oppose to each other.

At the opening section 2, there is provided an operation panel 11 comprising a VDT filter to enhance the visibleness of the display surface 3a of the display unit 3 and to prevent dust from being attached to the display surface 3a. A light blocking plate 8 having light passing holes 8a with a predetermined area and a predetermined depth is disposed on the front side of the light receiving elements 5 arranged in a column form so that only an incident light from the associated light emitting element 4 is received. Moreover, on the front side of the light blocking plate 8 and the light emitting elements 4, an infrared-ray filter 9 in a form of a rectangular frame is disposed in the entire periphery to block the visible light. Namely, the front side of the light receiving elements 5 arranged in a form similar to L and the front side of the light emitting elements 4 arranged also in a form similar to L oppose to the respective outer surfaces of the infrared-ray filter 9 in an rectangular form; and an end section 9a of the filter 9 opposes to the periphery of the operation panel 11. Consequently, on the front side of the operation panel 11, namely, on a side not opposing to the display surface 3a, an invisible light path 10 is formed by use of the infraredray filter 9.

For example, when a position of the operation panel 11 associated with an input position of the display surface 3a is pressed by a finger 12 to input the data of the position as shown in FIGS. 3 and 5, a light path 10 passing through the pressed position 20 is blocked among the light paths formed along the surface of the operation panel 11. Consequently, by sequentially effecting light emission of the light emitting elements 4 to perform the scanning, the blocked light path 11 in the x and y directions can be detected by use of the light receiving elements 5. The blocked light path 10 is determined by the arithmetic/operation unit 6 and the position of the coordinates is outputted to the host computer (not shown).

Such a conventional coordinates input apparatus is accompanied by a problem that dust in the air and dust fixed on the display surface 3a due to static electricity are drawn by an air flow indicated by an arrow mark in FIG. 13 to enter a space B between the infrared-ray filter 9 and the light receiving elements 5, namely, dust is likely to fix on the inner surface of the infrared-ray filter 9 and on the light receiving section 5a of the light receiving elements 5. This is also the case on the side of the light emitting elements 4, that is, dust is likely to attach on the light emitting section 4a. When dust fixes on the inner surface of the infrared-ray filter 9 and on the light receiving section 5a, the light transmittivity is considerably lowered, which may lead to a malfunction. Moreover, to prevent such a malfunction, the cleaning operation must be frequently conducted to remove the dust and the maintenance becomes complicated accordingly. Especially, an air flow is forcibly generated along the direction of the arrow mark as shown in FIG. 13 when a cooling fan is included in the display unit 3, which causes a considerable amount of dust to be fixed on the inner surface of the infrared-ray filter, the light emitting section 4a, the light receiving section 5a, and the like.

In the prior art coordinates input apparatuses the infrared-ray filter 9 formed with acryl resin or the like must be engaged with or fixed to the frame 1 formed with ABS resin or the like as shown in FIG. 13. Since the junction therebetween is exposed on the operation area A, the junction must be carefully conducted not to deteriorate the design of the apparatus, namely, stepped portions must not be formed and excessive adhesives must not be remained, which leads to a problem that the assembling operation becomes complex. Moreover, in such a conventional coordinates input apparatus, if an infrared-ray filter 9 formed with a hard material is designed to be tightly fixed to the operation panel 11 and the display surface 3a, there arises a danger that the filter 9 is damaged because of a dimensional error or the like; and hence a slight space 13 is disposed between the end section 9a of the filter 9 and the opposing section thereof, namely, the peripheral sections of the operation panel 11 and the display surface 3a. As a result, the dust in the air or the dust fixed on the operation panel 11 or the display surface 3a due to static electricity are drawn by the air flow into the space A (FIG. 15) on the rear side of the infrared-ray filter 9. The dust is then fixed on the rear surface of the infrared-ray filter 9, the light emitting section 4a, the light receiving section 5a, and the like, and hence the light transimittivity is likely to be reduced and a malfunction is caused. As a further problem, the cleaning operation must be frequently conducted to remove the dust and thus the maintenance becomes complicated.

The conventional optical coordinates input apparatus as described above cannot be adopted, particularly, as an apparatus to be borne on a vehicle.

SUMMARY OF THE INVENTION

It is therefore an object of the present invention to provide a coordinates input apparatus which prevents dust adversely affecting the light transmittivity from being entered there and which solves the problems of the prior art techniques described above.

Another object of the present invention is to provide a coordinates input apparatus which facilitates the assembling operation thereof and which solves the problems of the prior art techniques described above.

The technical problems to be solved by the present invention includes above-mentioned objects.

To achieve these objects, the present invention comprises the following means.

(1) In an optical coordinates input apparatus having pairs of light emitting elements and light receiving elements corresponding thereto, a plurality of pairs of light emitting elements and light receiving elements, the light emitting elements having a light path which has an intersection with light paths of the light emitting elements and the light receiving elements corresponding thereto, and a filter section disposed in the light paths of these optical semiconductor elements to allow a light passing through the light paths to pass therethrough characterised in that a flow of air containing dust is prevented from entering a space between the optical semiconductor elements and the filter section.

(2) In a coordinates input apparatus of the optical detection type having a plurality of optical semiconductor elements including light emitting elements and light receiving elements corresponding thereto and a filter disposed opposing to the optical semiconductor elements for blocking the visible light in which a light path is formed by use of the filter between the light emitting elements and the light receiving elements and on the front side of a display surface of a display unit and a position where the light path is blocked is detected so as to input a position of coordinates on the display surface characterised in that an airtight space is disposed between the filter and the optical semiconductor elements.

(3) In a coordinates input apparatus of the optical detection type having a plurality of optical semiconductor elements including light emitting elements and light receiving elements corresponding thereto, a filter disposed opposing to the optical semiconductor elements for selectively passing the infrared light, and a frame disposed continuously with respect to the filter for covering the optical semiconductor elements in which a light path is formed by use of the filter between the light emitting elements and the light receiving elements and on the front side of a display surface of a display unit and a position where the light path is blocked is detected so as to input a position of coordinates on the display surface characterised in that the filter and the frame are formed as a composite unit from a material selectively passing the infrared light and that light blocking means is disposed to block an incident light from the frame section of the composite unit to the light receiving elements.

(4) In a coordinates input apparatus of the optical detection type having a plurality of optical semiconductor elements including light emitting elements and light receiving elements corresponding thereto and a filter disposed opposing to the optical semiconductor elements for blocking the visible light in which a light path is formed by use of the filter between the light emitting elements and the light receiving elements and on the front side of a display surface of a display unit and a position where the light path is blocked is detected so as to input a position of coordinates on the display surface characterised in that a cushion member which is formed with a soft material and which has elasticity is disposed on an end section on the display surface side of the filter and that the cushion member is elastically brought into contact with a portion opposing the end section.

The technical means described above operate as follows.

According to the present invention, an airtight space is disposed so that air in the space external with respect to the airtight space is prevented from entering the space disposed between the visual light blocking filter and the optical semiconductor elements, thereby preventing the dust contained in the external air from entering the space.

Moreover, according to the present invention, the filter and the frame are formed into a composite unit and hence a complex joining operation to join the filter and the frame is unnecessitated. An unnecessary infrared light that may enter due to the composite unit configuration can be interrupted by light blocking means such as a coating varnish and a light blocking holder; furthermore, the space defined between the visual light blocking filter such as an infrared-ray filter and a section opposing the end section of the filter, namely, the space between the filter and the peripheral sections of the operation panel and the display surface is stuffed with a cushion member such as sponge so as to prevent dust from entering the space, which enables to keep a satisfactory light transimittivity in any cases.

BRIEF DESCRIPTION OF THE DRAWINGS

The present invention will be apparent from the following detailed description taken in conjunction with the accompanying drawings in which:

FIGS. 1 and 2 are schematic diagram for explaining a first embodiment of the present invention wherein FIG. 1 shows a cross-sectional view of the main section on the light emitting element side of the coordinates input apparatus and FIG. 2 is a perspective view of the infrared-ray filter of FIG. 1;

FIGS. 3, 4 and 5 are explanatory diagrams for explaining a second embodiment of the present invention wherein FIG. 3 shows a cross-sectional view of the main section on the light receiving element side of the coordinates input apparatus, FIG. 4 is a perspective view of the infrared-ray filter of FIG. 3, and FIG. 5 is a perspective view of the light blocking holder of FIG. 3;

DESCRIPTION OF THE PREFERRED EMBODIMENTS

A description will be given of embodiments of the present invention with reference to the accompanying drawings.

Figure 1:
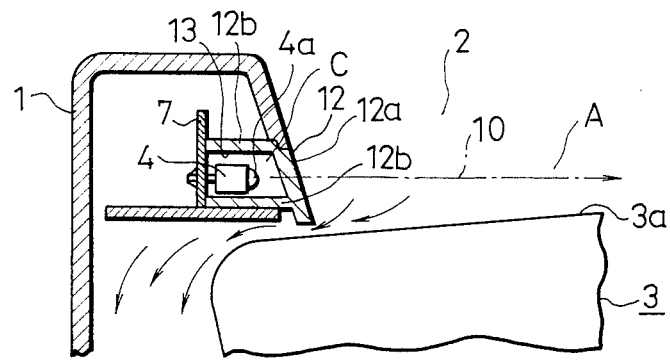
Figure 2:
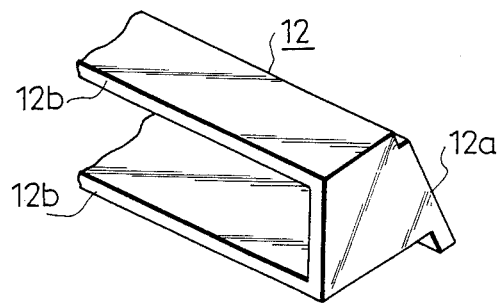

FIGS. 1-2 are schematic diagrams for explaining an embodiment of the present invention wherein FIG. 1 shows a cross-sectional view of the main section on the light emitting element side of the coordinates input apparatus and FIG. 2 is a perspective view of the infrared-ray filter of FIG. 1. In the embodiments to be described later, the same reference numerals will be assigned to the same components as those of the conventional example and explanation thereabout will be therefore omitted.

In FIGS. 1-2, reference numeral 12 indicates an infrared-ray filter comprising a member molded with acryl resin approximately in a shape of a Japanese katakana, a filter section 12a, and a dust blocking wall 12b and functions to block the visible light so as to selectively pass the infrared ray. Opposing to the filter section 12a of the infrared-ray filter 12, there is provided a light emitting section 4a of a light emitting elements 4. An end of the dust blocking wall 12b attached to the inner side of the infrared-ray filter 12 is fixed on a base plate 7 on which the light emitting elements 4 are secured. Consequently, the light emitting elements 4 are so configured to be confined in an airtight space or room 13 defined by the infrared-ray filter 12 and the base plate 7. That is, the airtight space 13 containing a space C formed between the filter section 12a and the light emitting section 4a is separated from the space external with respect to the coordinates input apparatus, and hence an air flow generated by a cooling fan or the like as indicated by an arrow mark in FIG. 1 does not affect the air inside the airtight space 13. With the provision of the airtight space 13 defined as described above, the dust contained in the external air, for example, the dust in the air and the dust on the display surface 3a is prevented from being drawn by the air flow to enter a space C formed between the filter section 12a and the light emitting section 4a, which guarantees prevention of the dust from fixing to the inner surface of the filter section 12a and to the surface of the light emitting section 4a and hence enables to maintain a satisfactory light transimittivity under any conditions. Moreover, since the airtight space 13 can be implemented only by slightly modifying the shape of the infrared-ray filter utilized in the prior art apparatus, there does not arise a problem of increase in the production cost.

Since the principle of the input operation of the embodiment is the same as the conventional example, the description thereabout will be omitted. The infrared-ray filter 12 may also be formed with other than the acryl resin, for example, vinyl chloride may be used.

Figure 3:
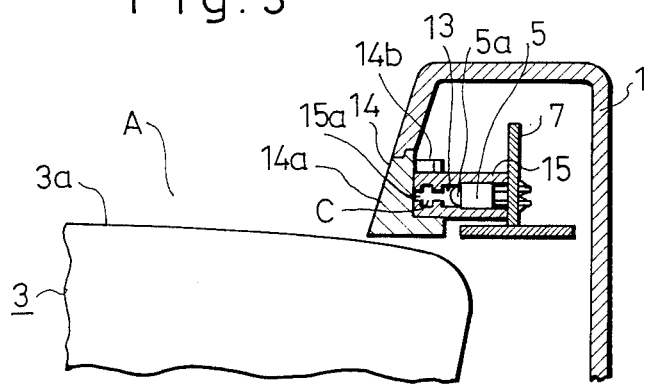
Figure 4:
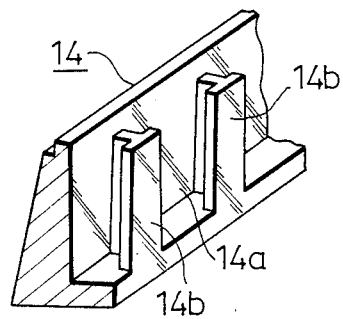
Figure 5:
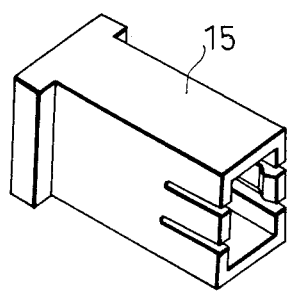

FIGS. 3–5 are explanatory diagrams for explaining another embodiment of the present invention wherein FIG. 3 shows a cross-sectional view of the main section on the light receiving element side of the coordinates input apparatus, FIG, 4 is a perspective view of the infrared-ray filter of FIG. 3, and FIG. 5 is a perspective view of the light blocking holder of FIG. 3. The same reference numerals are assigned to the same components as those of FIG. 1.

In this embodiment, the infrared-ray filter 14 having a filter section 14a and a coupling section or an engaging section 14b is combined with a light blocking holder 15 including light receiving elements 5 for blocking a scattered light incident thereto, thereby implementing a countermeasure against the dust. Namely, with the front surface of the light blocking holder 15 closely fixed on the inner surface of the filter section 14a, a front section of the light blocking holder 15 is engaged with the coupling section 14b, which allows to define the airtight space 13 on the front side of the light receiving element 5 in the light blocking holder 15, and hence the air C between the filter 14a and the light receiving section 5a is confined in the airtight space 13, namely, the air C is separated from the external space. As a consequence, even if the dust contained in the external space is drawn by the air flow to enter the inside of the coordinates input apparatus, the dust cannot enter the space C between the filter section 14a and the light receiving section 5a, thereby maintaining the light transimittivity at a satisfactory level.

Since the light blocking holder 15 of the embodiment includes a light passing hole 15a, the light blocking plate used in the conventional embodiment is unnecessitated.

Figure 6:
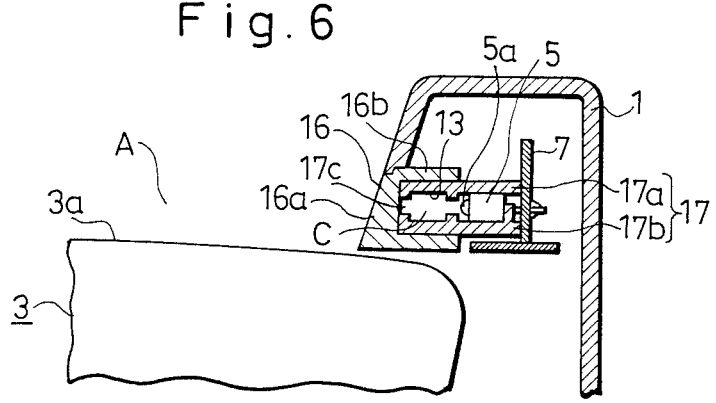
FIGS. 6 and 7 are diagrams for explaining a third embodiment of the present invention.
Figure 7:
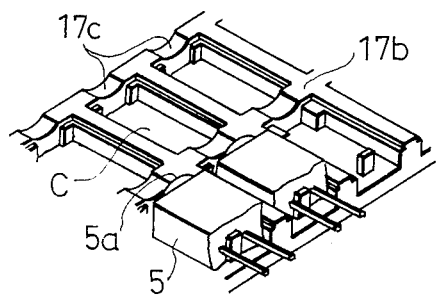

FIGS. 6-7 are diagrams for explaining still another embodiment of the present invention wherein FIG. 6 shows a cross-sectional view of the main section on the light receiving element side of the coordinates input apparatus and FIG. 7 depicts a perspective view of the inner configuration of the light blocking holder of FIG. 6. The same reference numerals are assigned to the same components as those of FIG. 3.

In this embodiment, an infrared-ray filter 16 having a filter section 16a and a coupling section 16b is combined with a light blocking holder 17 which comprises an upper section 17a and a lower section 17b and which can contain a plurality of light receiving elements arranged in a column, thereby implementing a countermeasure against the dust. When compared with the previous embodiment, this structure includes a reduced number of components. In this diagram, reference numeral 17c indicates a light passing hole, and the configuration of other sections not explained is basically the same as that of the previous embodiment.

Figure 8:
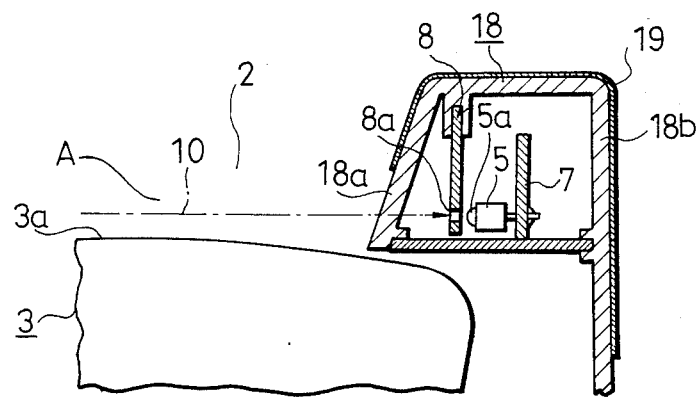
FIG. 8 is a cross-sectional view of the main section on the light receiving element side of the coordinates input apparatus of the second embodiment according to the present invention.
Figure 9:
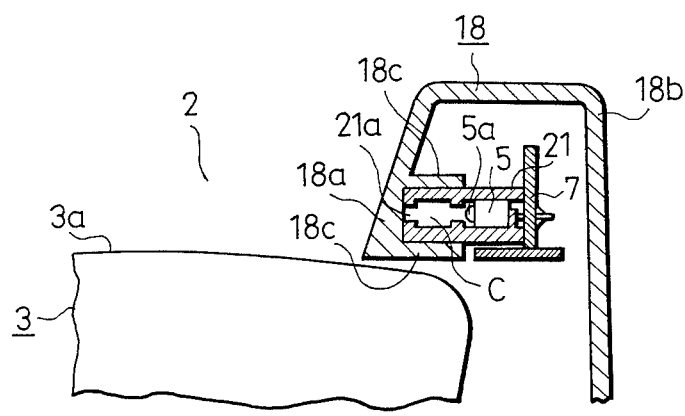
FIG. 9 is a cross-sectional view of the main section on the light receiving element side of the second embodiment according to the present invention.

FIGS. 8-9 are diagrams illustrating another embodiment in which the filter and the frame are formed in a composite unit.

In FIG. 8, reference numeral 18 denotes a molded body formed with vinyl chloride through a vacuum molding process and possesses a characteristic to block the visual light and to selectively pass the infrared ray. The composite unit 18 includes at an end thereof a filter section 18a, which opposes to the light receiving section 5a of the light receiving elements 5 via a light blocking plate 8. The surfaces of the portion of the composite unit 18 not including the filter section 18a namely, the frame section 18b are coated with a coating varnish which includes a pigment such as carbon black and which blocks at least the infrared ray. Consequently, the filter section 18a functions in the same fashion as the infrared-ray filter of the prior art apparatus to pass only the infrared ray of the incident light from the light emitting element side, and the frame section 18b coated with the coating varnish 19 blocks the visible light and the infrared ray. As a result, only the infrared ray that has passed the filter section 18a reaches the light receiving section 5a of the light receiving elements 5. The provision of the composite mold body 18 having the functions of the filter and the frame unnecessitates the complex operation to join the infrared-ray filter and the frame, which has been a problem in the prior art technique. And hence the operability of the assembling operation of the coordinates input apparatus can be greatly improved.

The same mold 18 is disposed on the light emitting element side (not shown). The filter section 18a thereof opposes to the light emitting section of the light emitting elements, which are covered by the frame section 18b. However, the frame section 18b of the mold 18 disposed on the light emitting element side need not be necessarily coated with the coating material 19. Although vinyl chloride is used as the material for the mold 18 in the embodiment, another material selectively passing the infrared ray, for example, an acryl resin may also be used. The components and the input principle not particularly, described are the same as those of the conventional examples described above.

FIG. 9 is a cross-sectional view of the main section on the light receiving element side of the coordinates input apparatus according to another embodiment of the present invention in which the same reference numerals are assigned to the same components as those of FIG. 8. In this embodiment, in place of the application of the coating material to the frame section 18b of the mold body 18, a light blocking holder 21 is provided which comprises an upper section and a lower section each formed with polyacetal. The light receiving elements 5 are contained in the light blocking holder 21. A light passing hole 21a is disposed in the front wall of the light blocking holder 21 so as to oppose to the filter section 18a of the mold body 18. Consequently, the infrared ray passing through the filter section 18a can reach the light receiving section 5a of the light receiving elements 5; however, the infrared-ray passing through the frame section 18b of the mold 18 is blocked by the wall surface of the light blocking holder 21 and thus cannot reach the light receiving section 5a, which guarantees the reliability like the preceding embodiments.

In this embodiment, a protrusion 18c is formed on the inner surface of the filter section 18a of the mold 18 so that the front section of the light blocking holder 21 is engaged in a space defined by the protrusion 18c. Moreover, since the light passing hole 21a is formed in the light blocking holder 21, the light blocking plate 8 is unnecessitated. Furthermore, the material of the light blocking holder 21 is not limited to polyacethal, but any material that can block at least the infrared ray is applicable.

Figure 10:
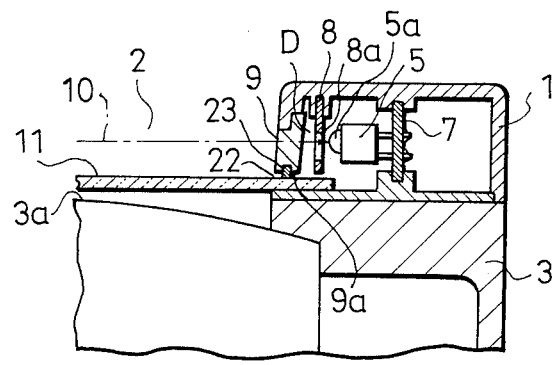
FIG. 10 is a cross-sectional view of the main section on the light receiving element side of the third embodiment according to the present invention.
Figure 11:
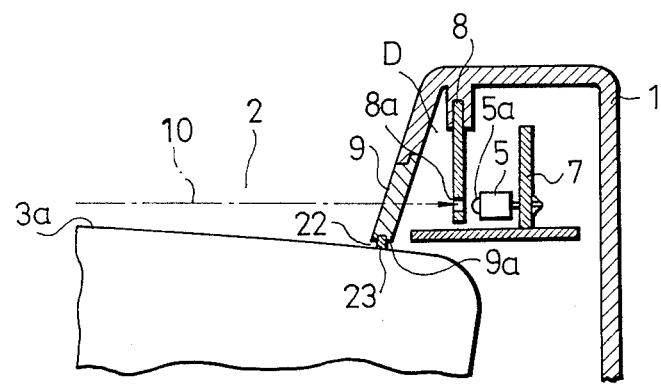
FIG. 11 is a cross-sectional view of the main section on the light receiving element side of the third embodiment, according to the present invention.
Figure 12:
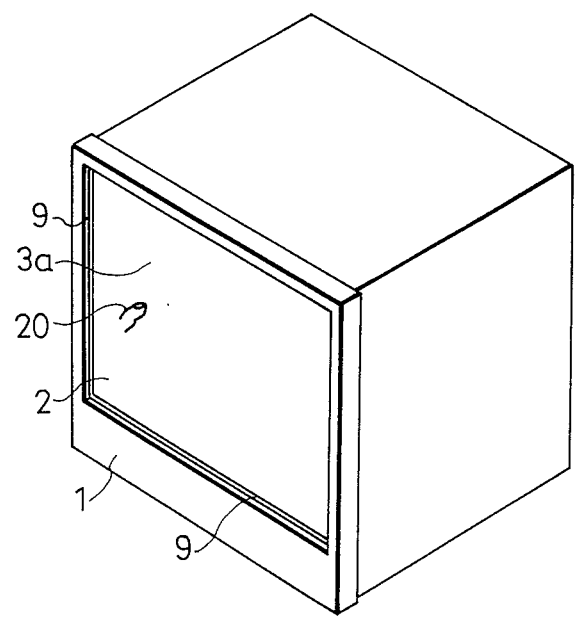
FIGS. 12, 13, 14, 15, and 16 are diagrams illustrating conventional examples.
Figure 13:
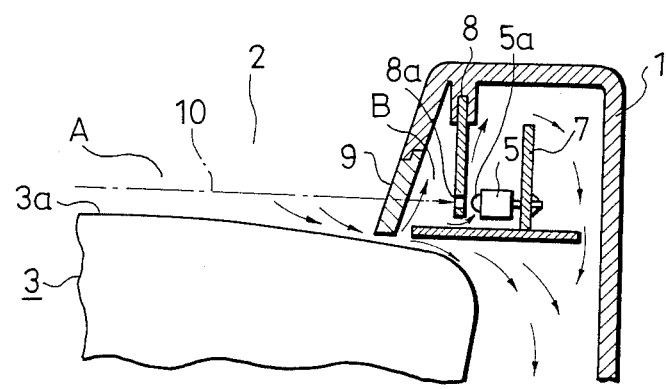
Figure 14:
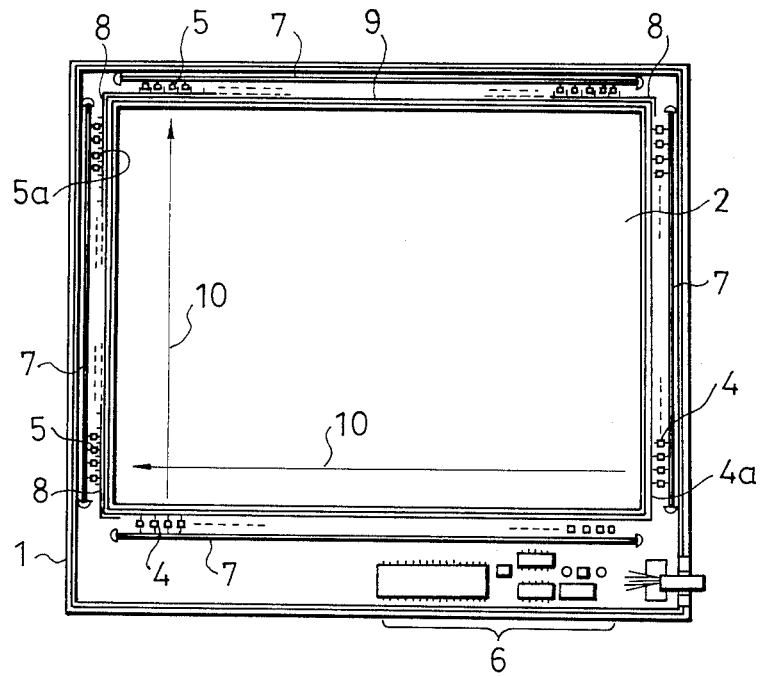
Figure 15:
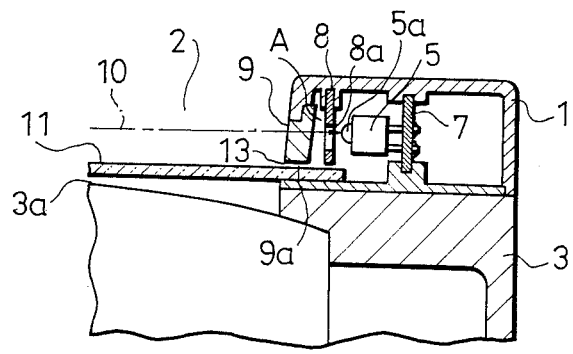
Figure 16:
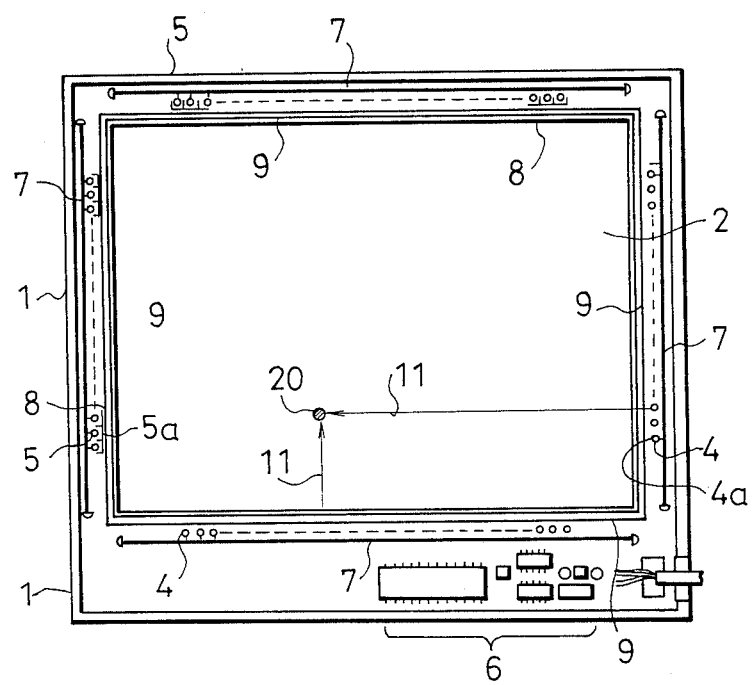

FIGS. 10-11 are schematic diagrams depicting another embodiment in which a cushion member is used.

In FIG. 10, an infrared-ray filter 9 disposed to oppose to the light receiving section 5a of the light receiving elements 5 via the light passing hole 8a of the light blocking plate 8 has an end section fixedly mounted on the frame 1, thereby defining the periphery of the opening section 2. Another end 9a of the infrared-ray filter 9 opposes to the peripheral section of the operation panel 11 and is provided with a cushion member 23 formed with a material like sponge, which is elastically brought into contact with the operation panel 11; consequently, the space 22 is not connected to the space 22 formed between the infrared-ray filter 9 and the light receiving elements 5. As a result, the dust existing on the side of the opening section 2 is blocked by the cushion member 23 and hence cannot enter the space D, namely, the prevention of dust from being attached to the inner surface of the infrared-ray filter 9 and to the light receiving section 5a can be guaranteed, which enables a satisfactory light transimittivity to be maintained in any situations. Since the cusion member 23 is not stiff, the infrared-ray filter 9 and the operation panel 11 cannot be damaged by the cushion member 23; moreover, a low-priced cushion member can be easily incorporated in the apparatus.

Although the embodiment has been described only with respect to the light receiving element side, the operations are also the same on the light emitting element side, namely, a cushion member 23 is buried in the end section 9a on the side of the operation panel 11 of the infrared-ray filter 9 opposing to the light emitting section so as to prevent the dust from entering the apparatus.

FIG. 11 is a diagram illustrating a cross-sectional view of the main section on the light receiving element side of another embodiment using a cushion member 23 according to the present invention. This is an example of a coordinates input apparatus in which the input operation is conducted directly on the display surface or screen without using the operation panel.

In the apparatus of this type as shown in FIG. 11, the end section 9a of the infrared-ray filter 9 opposes to the peripheral section of the displav surface 3a, and like in the previous embodiment, the cushion member 23 is buried in the end section 9a so that the cushion member 23 is elastically brought into contact with the display surface 3a, thereby preventing the dust from entering the space D defined between the infrared-ray filter 9 and the light receiving elements 5.

As described above, according to the present invention, the space defined between a filter such as an infrared-ray filter blocking the visible light and the optical semiconductor elements including light emitting elements or light receiving elements is sealed with an airtight space or room; consequently, the external dust is not allowed to enter the space and a satisfactory light transmittivity can be maintained in any cases, which prevents a malfunction due to the dust fixed to the apparatus and allows to improve the maintenance.

Furthermore, according to the embodiment in which the filter and the frame are formed in a composite unit, since a mold body including the filter and the frame is used, the complex operation to join the filter and the frame is unnecessitated and the assembling operation is considerably improved; moreover, with the provision of the light blocking means such as the coating material and the light blocking holder, the reliability can be retained.

According to the embodiment utilizing a cushion member, a cushion member is disposed on the end section of the visible light blocking filter such as an infrared-ray filter opposing to the light emitting elements and the light receiving elements, and the cushion member is stuffed between the end section and the opposing section so as to prevent the dust from entering the space therebetween. As a result, the dust is prevented from easily fixing to the inner surface of the visible light blocking filter and on the light emitting section of the light emitting elements and the light receiving section of the light receiving elements, which enables to keep a satisfactory light transimittivity under any conditions.

While the present invention has been described with reference to the particular illustrative embodiments, it is not to be restricted by those embodiments but only by the appended claims. It is to be appreciated that those skilled in the art can change or modify the embodiments without departing from the scope and the spirit of the present invention.

We claim:

1. An optical coordinate input apparatus having a frame mounted to a display screen or operation panel, two sets of optical elements arranged mutually orthogonal to each other on respective sides of said frame so as to define an optical input area in front of said display screen, each set including a row of light emitting elements for emitting respective light beams across said input area to be received by a row of corresponding light receiving elements, respectively, and means for detecting a coordinate input position where a light beam is blocked by an object interposed in the input area, wherein the improvement comprises a structure for preventing dust contamination of the optional elements formed by a longitudinal row of optical elements mounted to a longitudinal base plate on one side thereof, and a longitudinal filter member which is formed as an integral body of a longitudinal front wall for transmission of the light beams therethrough joined to longitudinal top and bottom walls and is mounted to said base plate by said top and bottom walls being fixed against said base plate to form an airtight chamber therein.

2. An optical coordinate input apparatus according to claim 1, wherein said optical elements transmit or receive infra-red light beams, and said front, top, and bottom walls are integrally molded as one piece from an infra-red ray filtering plastic material.

3. An optical coordinate input apparatus according to claim 1, wherein said optical elements transmit or receive infra-red light beams, and said front wall is made of an infra-red ray filtering plastic material and has an engaging section, and said top and bottom walls are formed as a light blocking holder for the optical elements which is fixedly coupled to said front wall by said engaging section.

4. An optical coordinate input apparatus according to claim 1, wherein said optical elements transmit or receive infra-red light beams, and said frame is integrally molded as one piece from an infra-red light filtering plastic material to form said front wall, and said top wall and said bottom wall are formed by a light blocking holder having one side mounted fixedly againt said base plate and its other side fixedly engaged with said front wall of said frame.

5. An optical coordinate input apparatus according to claim 1, wherein said optical elements transmit or receive infra-red light beams, and said frame forms said top and bottom walls fixedly mounted against said base plate, and said front wall is formed of infra-red light filtering material and fixedly mounted between an end of said top wall and said display screen or operation panel, and further wherein a cushion member made of a soft, elastic material is provided on an end of said front wall elastically in contact with said display screen or operation panel.

6. An optical coordinate input apparatus according to claim 1, wherein said optical elements transmit or receive infra-red light beams, and said frame is integrally molded as one piece from an infra-red ray filtering plastic material to form said front wall, said top wall, and a third wall in place of said bottom wall, said front wall and said third wall are fixedly mounted on said base plate to form said airtight chamber for said row of optical elements, and infra-red light blocking means are provided with said frame to block spurious infra-red light from entering through said frame to said optical elements.

7. An optical coordinate input apparatus according to claim 6, wherein said light blocking means includes an infra-red light blocking layer coated on an external surface of said molded frame in portions other than transmission portions of said front wall for the light beams.

8. An optical coordinate input apparatus according to claim 6, wherein said light blocking means includes an infra-red light blocking plate which blocks infra-red light except for holes formed in alignment with the respective optical elements for transmission of the light beams.

* * * * *